W. J. HAYES & P. H. DEMING.
ROTARY FILE CABINET.
APPLICATION FILED MAY 13, 1910.

1,004,784.

Patented Oct. 3, 1911.

3 SHEETS—SHEET 1.

Witnesses
O. B. Baenziger.
J. L. Howlett.

Inventors.
Walter J. Hayes.
Paul H. Deming.
By T. S. Wheeler.
Attorney

W. J. HAYES & P. H. DEMING.
ROTARY FILE CABINET.
APPLICATION FILED MAY 13, 1910.
1,004,784.
Patented Oct. 3, 1911.
3 SHEETS—SHEET 2.
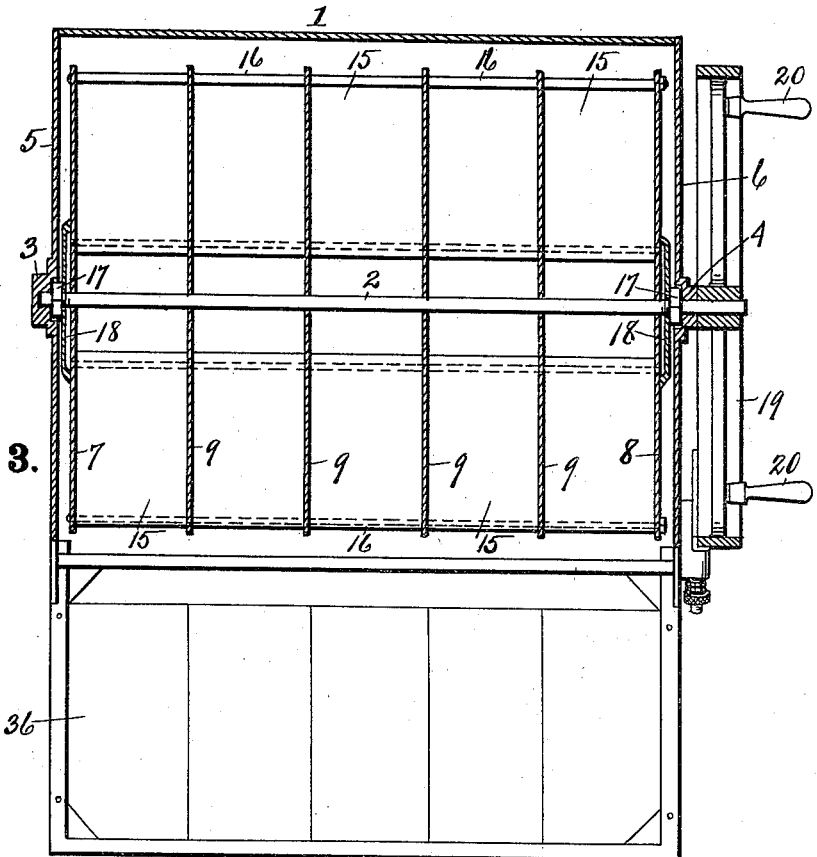
Fig. 3.
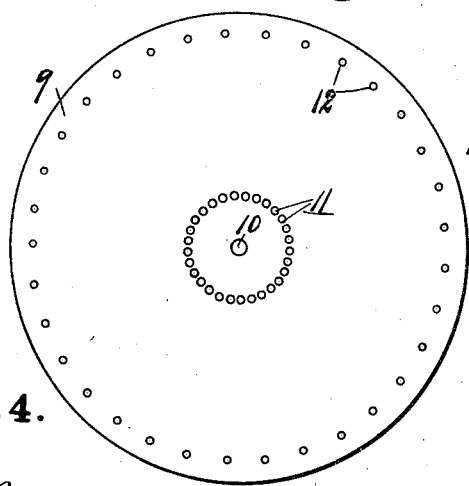
Fig. 4.
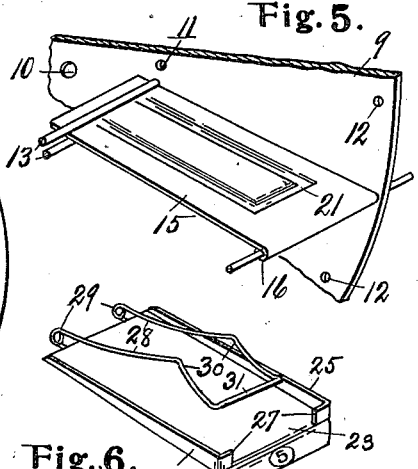
Fig. 5.
Fig. 6.

W. J. HAYES & P. H. DEMING.
ROTARY FILE CABINET.
APPLICATION FILED MAY 13, 1910.
1,004,784.
Patented Oct. 3, 1911.
3 SHEETS—SHEET 3.
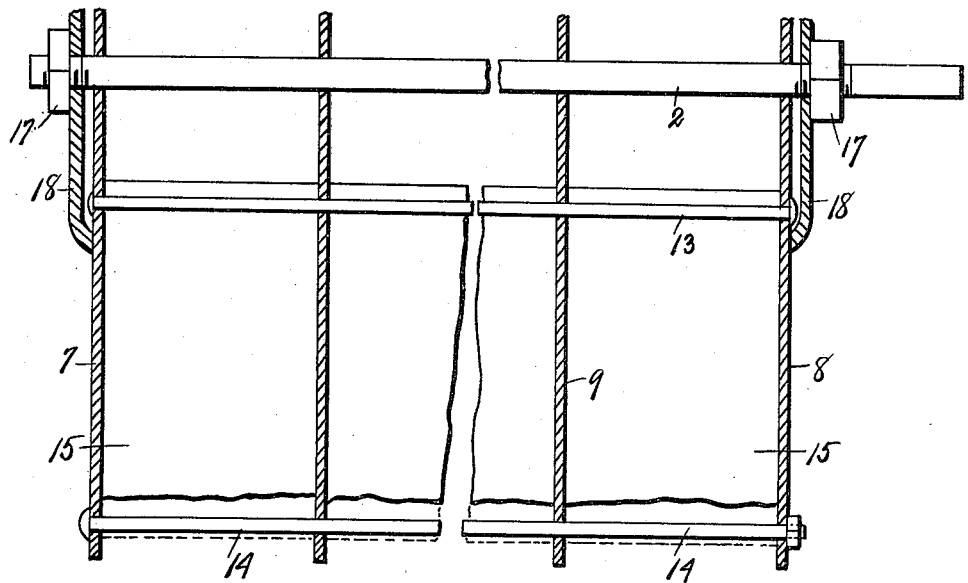
Fig. 7.
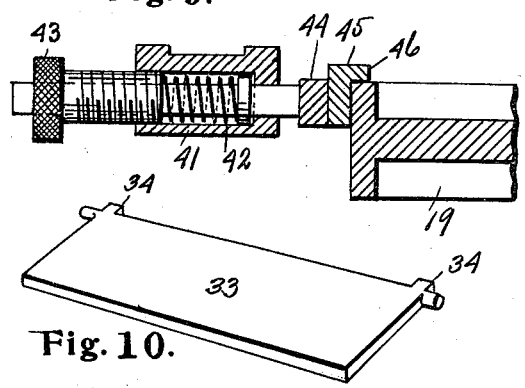
Fig. 9.
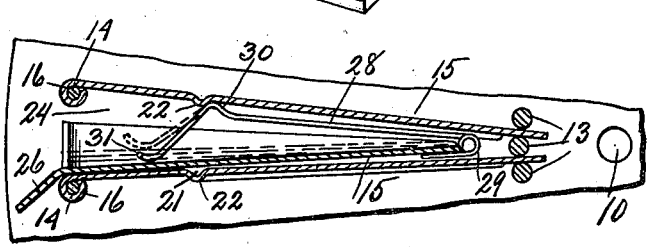
Fig. 10.
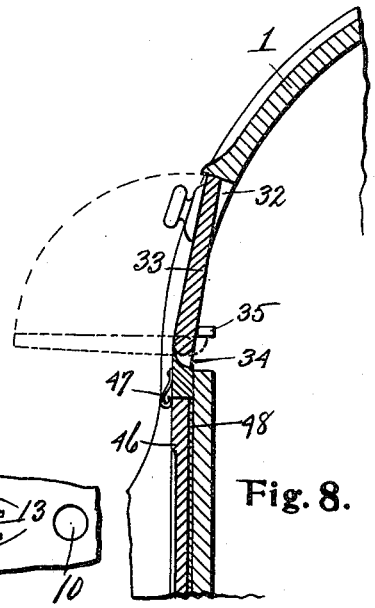
Fig. 8.
Fig. 11.
Witnesses
O. B. Baenziger.
J. G. Howlett.
Inventors
Walter J. Hayes
Paul H. Deming.
By E. A. Wheeler,
Attorney

UNITED STATES PATENT OFFICE.

WALTER J. HAYES, OF WINDSOR, ONTARIO, CANADA, AND PAUL H. DEMING, OF GROSSE POINTE FARMS, MICHIGAN, ASSIGNORS TO FAIRVIEW MANUFACTURING COMPANY, OF DETROIT, MICHIGAN, A CORPORATION OF MICHIGAN.

ROTARY FILE-CABINET.

1,004,784.  Specification of Letters Patent.  Patented Oct. 3, 1911.

Application filed May 13, 1910. Serial No. 561,049.

*To all whom it may concern:*

Be it known that we, WALTER J. HAYES, a citizen of the United States, residing at Windsor, Essex county, Ontario, Canada, and PAUL H. DEMING, a citizen of the United States, residing at Grosse Pointe Farms, in the county of Wayne, State of Michigan, have invented certain new and useful Improvements in Rotary File-Cabinets; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to rotary file cabinets, and consists in the construction and arrangement of parts hereinafter more fully set forth and pointed out particularly in the claims.

The primary object of the invention is to provide simple and efficient means for filing the sale slips of customers in a retail store so as to enable them to be readily inserted in and quickly withdrawn from their respective files, provision being made for rotating the cylinder in which the sale slips are filed to bring into accessible position the sale slips of a customer, and for determining the exact position to which the cylinder must be moved by means of an index and guide numerals to bring before the opening in the case, the sale slips of the customer desired.

A further object is to provide a suitable structure for the purpose desired having such mechanical features as to simplify the operation of assembling the parts and render the structure serviceable and applicable for the purpose intended.

The above objects are attained by the mechanism illustrated in the accompanying drawings, in which:—

Figure 1:
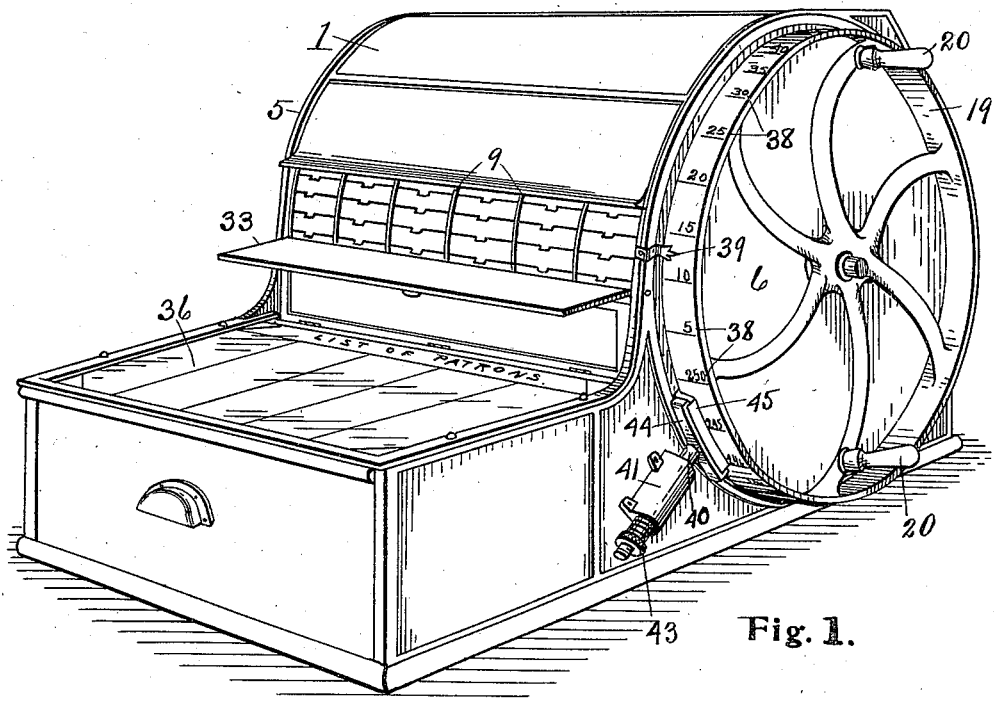
Figure 2:
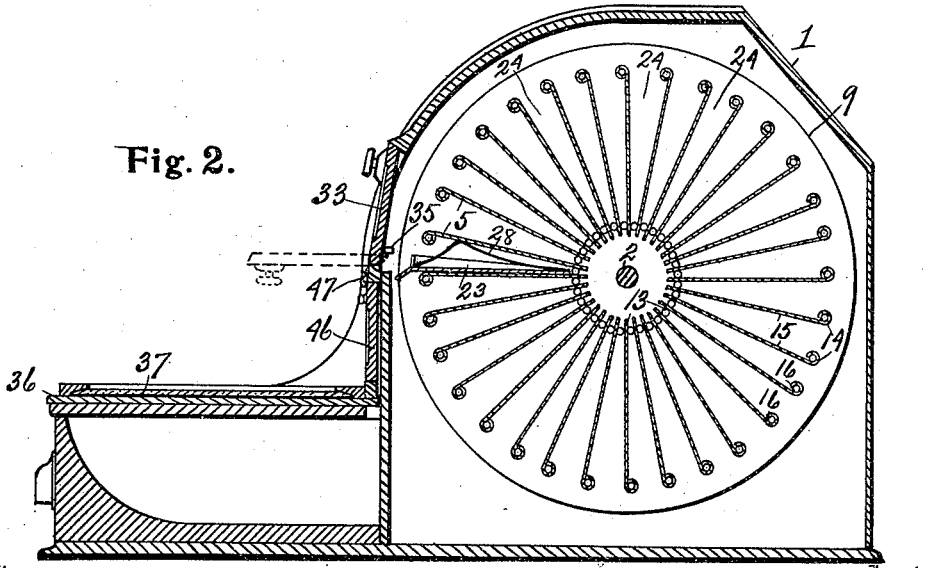

Figure 1 is a perspective view of a rotary file cabinet involving our invention. Fig. 2 is a transverse section therethrough. Fig. 3 is a horizontal section through the case and rotary cylinder therein. Fig. 4 is a side elevation of one of the dividing disks which separate the cylinder into a plurality of circular divisions. Fig. 5 is a fragmentary view in perspective, showing a portion of one of said disks and illustrating the manner of mounting radially between the faces of the disks of the cylinder, the partitions which separate the circular divisions of the cylinder into a plurality of radial filing spaces or compartments. Fig. 6 is a perspective view of one of the filing trays. Fig. 7 is a fragmentary view in section, showing the shaft which extends axially of the cylinder and the tie rods which pass through the dividing disks and serve as supports for the radial partitions. Fig. 8 is an enlarged fragmentary view in section through the front portion of the case, showing the door which closes the opening therein through which the sale slips in the compartments of the cylinder are rendered accessible. Fig. 9 is an enlarged fragmentary view in section showing the spring actuated friction brake which bears against the periphery of the rotatable wheel mounted on the projecting end of the cylinder shaft. Fig. 10 is a perspective view of the hinged door. Fig. 11 is an enlarged fragmentary view in section diametrically of the cylinder and through two of the radial partitions thereof, showing a tray in position in one of the compartments formed by said partition.

Referring to the characters of reference, 1 designates a suitable case in which is journaled a cylindrical file cabinet upon the shaft 2, the ends of which are supported to have bearing in the bosses 3 and 4 of the ends 5 and 6 of the case, respectively. The cylinder proper consists of the end disks 7 and 8, respectively, and the interposed disks 9. Each of said disks, as shown in Fig. 4, is provided with a central aperture 10 through which the shaft 2 passes, and with a plurality of apertures 11 disposed in a circle concentric with respect to the aperture 10, the margin of each of said disks being provided with a plurality of apertures 12 arranged in a circle concentric with the axis thereof. Passing through the apertures 11 in the disks are the rods 13 which extend longitudinally of the cylinder and which because of the proximity of said apertures, lie closely together. Passing through the marginal apertures 12 in said disks are the rods 14 spaced a considerable distance apart.

The disks of the cylinder are separated and at the same time the circular spaces between them are divided into a plurality of radial compartments by the interposed radial partitions or dividing plates 15, each of which is provided at its outer end with a rolled eye 16 through which the outer rods 14 pass, the inner ends of said partitions lying between two of the closely disposed rods 13, as clearly shown in Fig. 5. By this arrangement said partitions are securely retained in place when the parts are assembled, and at the same time serve to space the disks of the cylinder from one another and divide the intervening spaces between said disks into radially disposed compartments for the reception of the sale slips of customers of retail merchants. The shaft 2 which passes longitudinally through the center of the cylinder has upon its ends the nuts 17 which engage the dished washers 18 that bear against the ends disks of the cylinder, thereby assisting to firmly clamp the parts of the cylinder together. Upon the projecting end of the shaft 2 is a hand wheel 19 carrying the handles 20 through the medium of which said wheel may be turned to rotate the cylinder.

Each of the radial dividing partitions 15 is provided in the upper face thereof with a quadrangular channel 21 formed by displacing the metal in suitable dies and producing on the under side of each of said partitions a projecting bead or shoulder 22. By striking up said bead, as shown, the metal of the partitions is stiffened and the transverse portion of said bead forms a locking shoulder for purposes hereinafter stated. To provide for retainers for the sale slips of the customers, trays 23 are used adapted to be inserted into and withdrawn from the radial compartments 24 (see Fig. 2) of the cylinder, said trays consisting of a plate of thin sheet metal having raised margins 25 between which the sale slips are adapted to lie and provided with a downwardly projecting lip 26 at the front on which may be placed a numeral indicating the number of the customer, as shown in Fig. 6. The outer end portions of the raised margins 25 are turned inwardly, as at 27, to form abutments which prevent the sale slips from accidentally sliding out of the tray. To hold the slips in each tray in place as the rotary cylinder or file cabinet is revolved, each tray is provided with a spring 28 trilateral in form whose rear ends are attached to the bottom of the tray in any suitable manner, and are provided with coiled springs 29 whose tension is normally exerted to hold the front end of the spring raised. The longitudinal members of the spring are bent transversely to form a shoulder 30 therein, and the forward portions of the longitudinal members of the spring in front of said shoulders are curved downwardly and forwardly and are connected by the cross bar 31. This formation of the spring 28 is for the purpose of locking the trays in their respective compartments of the cabinet, and at the same time applying sufficient pressure to the sale slips to retain them in the trays.

When a tray with the sale slips therein is inserted in one of the radial compartments 24, as shown in Fig. 11, the coiled springs 29 at the rear of the longitudinal members of the spring 28 will urge the front end of the spring upwardly so as to cause the shoulders 30 in the longitudinal members thereof to engage in the rear of the bead 22, thus frictionally locking the tray against removal, at the same time the forward ends of the longitudinal members are pressed downwardly onto the sale slips, thereby binding them firmly in the tray, as shown by dotted lines in Fig. 11. To withdraw any one of the trays, it is only necessary to exert sufficient outward force thereon by grasping the projecting lip 26 to cause the shoulders 30 on the longitudinal members of the spring to slip past the bead 22, the yielding nature of the spring readily permitting of this operation, when the tray is free to be withdrawn.

To afford access to the radial compartments in the cylinder, the front of the case is provided with an opening 32 extending longitudinally thereof the entire length of the cylinder through which a number of the horizontal rows of said compartments are exposed. Said opening is normally closed by a door 33 hinged at its lower edge and adapted to swing outwardly to a horizontal position, as shown in Fig. 1, and by dotted lines in Figs. 2 and 8. To support said door in said horizontal position, it is provided at its bottom edge with projecting lugs 34, shown more clearly in Fig. 10, which are adapted to engage stop lugs 35 (see Fig. 8) projecting from the ends of the case. When supported in a horizontal position, the door serves as a kind of table on which the trays may be placed preparatory to inserting them into their respective compartments in the cylinder or after they shall have been withdrawn and while removing the slips therefrom or inserting new slips therein.

A removable index card or sheet 36 is provided supported at the forwardly projecting portion of the case under a glass 37 containing the names of the regular customers of a store opposite which are placed numerals corresponding to the numbers of the trays in which the sale slips of said customers are kept. To enable the tray containing the account of a particular customer to be brought to the opening in the front of the case in order to render it accessible, guide numerals 38 corresponding with the numbers of the trays and with the index of the customers are placed upon the periphery of the wheel 19, as shown in Fig. 1. Upon a fixed portion of the case is an indicating hand or pointer 39 which projects over the periphery of the wheel and which is disposed opposite the opening in the case. The arrangement is such that when the wheel 19 shall have been rotated so as to present a certain number thereon opposite the pointer 39, the tray in the cabinet or cylinder bearing said number will be presented before the opening in the case. Should it be desired to remove from the file the tray containing the sale slips of John Bell, and it is found on referring to the index that John Bell's number is "10", the wheel 19 is rotated so as to bring the guide numeral 10 thereon opposite the pointer 39, when the tray bearing the numeral 10 in one of the divisions of the cylinder will be presented before the opening in the front of the case in position for removal.

For the purpose of holding the cylinder against accidental rotation, a friction brake is employed which bears against the periphery of the wheel 19, said brake consisting of a spring actuated plunger 40 mounted in a housing 41 secured to the case, said plunger being constantly urged forward by a coiled spring 42 which engages it at one end and which is compressed by the knurled nut 43 on the outer end of said plunger. The inner end of the plunger is provided with a shoe 44 having a facing 45 of frictional material which bears against the periphery or rim of the wheel 19 and is provided at one margin with a flange 46 (see Fig. 9) to prevent the shoe from turning, the shoe and facing being curved to coincide with the arc of the wheel. This brake device exerts sufficient pressure against the wheel to prevent the cylinder from turning, except when rotated by means of the handles 19. In the front of the case is a removable door 46 (see Fig. 8) held in place by a spring latch 47 behind which may be kept an index 48 for transient account or for the accounts of those who are not regular customers.

Having thus fully set forth our invention, what we claim as new and desire to secure by Letters Patent, is:—

1. In a rotary file cabinet, a rotatable cylinder comprising a plurality of circular disks, a series of radial partitions interposed between said disks and dividing said cylinder into a plurality of radial compartments, a plurality of rods passing through and connecting said disks, said rods being disposed in concentric circles, the inner ends of said radial partitions confined between the rods describing the inner circle, and the outer ends of said partitions being secured to and supported by the rods describing the outer circle, and means for clamping said parts together.

2. In a rotary file cabinet, a rotatable cylinder comprising a plurality of circular disks, a series of radial partitions interposed between said disks and dividing the cylinder into a plurality of radial compartments, a plurality of rods passing through and connecting said disks, said rods being disposed in two concentric circles, the inner ends of each of said radial partitions lying freely between two of the rods describing the inner of said circles, and the outer ends of said partitions being secured respectively to one only of the rods describing the outer of said circles, a shaft passing through said cylinder and journaled at its ends, and means connected with the end of said shaft for rotating said cylinder.

3. In a rotary file cabinet, a rotatable cylinder, a series of radial partitions therein dividing said cylinder into a plurality of radial compartments, each of said partitions having remote from its ends a transverse bead projecting from one face thereof, a tray to contain sale slips adapted to enter the radial compartments of said cylinder, a spring member on said tray and confined wholly within the length thereof having a projecting shoulder adapted to frictionally engage said bead and having a free end portion adapted to bear upon the sale slips in said tray.

In testimony whereof, we sign this specification in the presence of two witnesses.

WALTER J. HAYES.
PAUL H. DEMING.

Witnesses:
E. S. WHEELER,
I. G. HOWLETT.

---

Copies of this patent may be obtained for five cents each, by addressing the "Commissioner of Patents, Washington, D. C."